(12) United States Patent
Tucker

(10) Patent No.: US 10,126,120 B2
(45) Date of Patent: Nov. 13, 2018

(54) DETERMINING ANGULAR POSITION FROM INDEX OF REFRACTION OFFSET

(71) Applicant: Southern Research Institute, Birmingham, AL (US)

(72) Inventor: James Richard Tucker, Hoover, AL (US)

(73) Assignee: Southern Research Institute, Birmingham, AL (US)

( * ) Notice: Subject to any disclaimer, the term of this patent is extended or adjusted under 35 U.S.C. 154(b) by 0 days.

(21) Appl. No.: 15/727,222

(22) Filed: Oct. 6, 2017

(65) Prior Publication Data

US 2018/0100734 A1 Apr. 12, 2018

Related U.S. Application Data

(60) Provisional application No. 62/404,995, filed on Oct. 6, 2016.

(51) Int. Cl.
*G01B 11/26* (2006.01)
*G01D 5/00* (2006.01)

(52) U.S. Cl.
CPC .............. *G01B 11/26* (2013.01); *G01D 5/00* (2013.01)

(58) Field of Classification Search
CPC ....... G01B 11/26; G01B 11/272; G01B 11/27; G01C 15/004; G01C 15/002
USPC ......................................................... 356/138
See application file for complete search history.

(56) References Cited

U.S. PATENT DOCUMENTS

| | | | |
|---|---|---|---|
| 3,940,609 A | 2/1976 | Johnstun | |
| 5,449,900 A | 9/1995 | Halliwell | |
| 6,183,129 B1 * | 2/2001 | Aoyama | G01J 5/02 33/DIG. 21 |
| 7,859,977 B2 * | 12/2010 | Tan | G02B 5/305 369/110.04 |
| 2007/0041018 A1 | 2/2007 | Kruokin et al. | |
| 2008/0049584 A1 * | 2/2008 | Tan | G02B 5/305 369/112.16 |

OTHER PUBLICATIONS

International Search Report in corresponding PCT Application No. PCT/US17/55612, dated Dec. 12, 2017.

* cited by examiner

*Primary Examiner* — Md M Rahman
(74) *Attorney, Agent, or Firm* — Edell, Shapiro & Finnan, LLC

(57) ABSTRACT

An apparatus for measuring the angular position of a rotatable body comprises: refractive elements extending radially outward from a peripheral surface of the rotatable body at respective angular locations; first and second emitters that respectively emit first and second light beams along first and second path extending through respectively first and second regions within an annual vicinity around the rotatable body, wherein the refractive elements are arranged to pass through and laterally shift the light beams upon rotation of the rotatable body; first and second detectors arranged to respectively receive the first and second light beams and to determine respective first and second lateral offsets of the light beams caused by the time-varying angular orientation of refractive elements within the light beams; and a processor that determines an angular position of the rotatable body based on the first and second lateral offsets.

20 Claims, 8 Drawing Sheets

| ANGLE IN | n1 | n2 | ANGLE MEDIUM | LENGTH (mm) | n3 | ANGLE OUT | OFFSET |
|---|---|---|---|---|---|---|---|
| -22.00 | 1.00 | 1.70 | -12.730 | 125.0 | 1.00 | -22.00 | -22.265 |
| -20.00 | 1.00 | 1.70 | -11.606 | 125.0 | 1.00 | -20.00 | -19.823 |
| -18.00 | 1.00 | 1.70 | -10.473 | 125.0 | 1.00 | -18.00 | -17.508 |
| -16.00 | 1.00 | 1.70 | -9.331 | 125.0 | 1.00 | -16.00 | -15.304 |
| -14.00 | 1.00 | 1.70 | -8.181 | 125.0 | 1.00 | -14.00 | -13.195 |
| -12.00 | 1.00 | 1.70 | -7.025 | 125.0 | 1.00 | -12.00 | -11.166 |
| -10.00 | 1.00 | 1.70 | -5.863 | 125.0 | 1.00 | -10.00 | -9.205 |
| -8.00 | 1.00 | 1.70 | -4.696 | 125.0 | 1.00 | -8.00 | -7.300 |
| -6.00 | 1.00 | 1.70 | -3.525 | 125.0 | 1.00 | -6.00 | -5.438 |
| -4.00 | 1.00 | 1.70 | -2.352 | 125.0 | 1.00 | -4.00 | -3.607 |
| -2.00 | 1.00 | 1.70 | -1.176 | 125.0 | 1.00 | -2.00 | -1.798 |
| 0.00 | 1.00 | 1.70 | 0.000 | 125.0 | 1.00 | 0.00 | 0.000 |
| 2.00 | 1.00 | 1.70 | 1.176 | 125.0 | 1.00 | 2.00 | 1.798 |
| 4.00 | 1.00 | 1.70 | 2.352 | 125.0 | 1.00 | 4.00 | 3.607 |
| 6.00 | 1.00 | 1.70 | 3.525 | 125.0 | 1.00 | 6.00 | 5.438 |
| 8.00 | 1.00 | 1.70 | 4.696 | 125.0 | 1.00 | 8.00 | 7.300 |
| 10.00 | 1.00 | 1.70 | 5.863 | 125.0 | 1.00 | 10.00 | 9.205 |
| 12.00 | 1.00 | 1.70 | 7.025 | 125.0 | 1.00 | 12.00 | 11.166 |
| 14.00 | 1.00 | 1.70 | 8.181 | 125.0 | 1.00 | 14.00 | 13.195 |
| 16.00 | 1.00 | 1.70 | 9.331 | 125.0 | 1.00 | 16.00 | 15.304 |
| 18.00 | 1.00 | 1.70 | 10.473 | 125.0 | 1.00 | 18.00 | 17.508 |
| 20.00 | 1.00 | 1.70 | 11.606 | 125.0 | 1.00 | 20.00 | 19.823 |
| 22.00 | 1.00 | 1.70 | 12.730 | 125.0 | 1.00 | 22.00 | 22.265 |

FIG.3

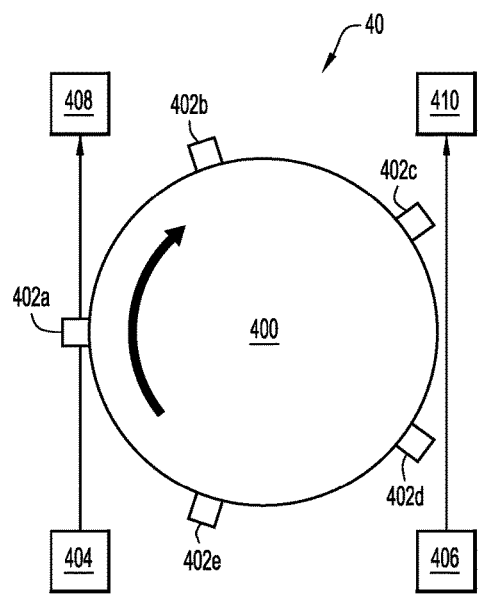
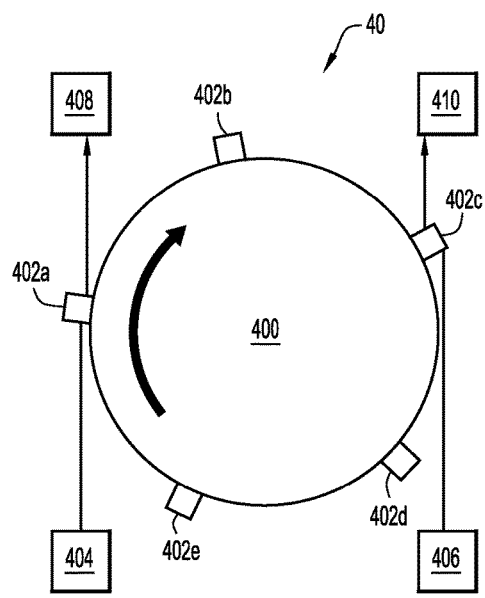
FIG.5A　　　　　　　　　　FIG.5B
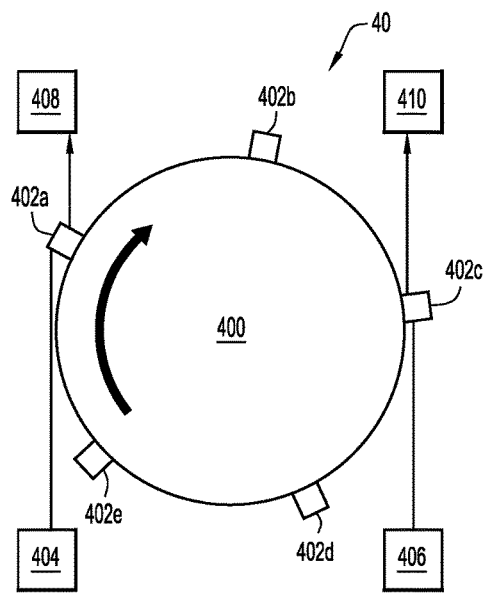
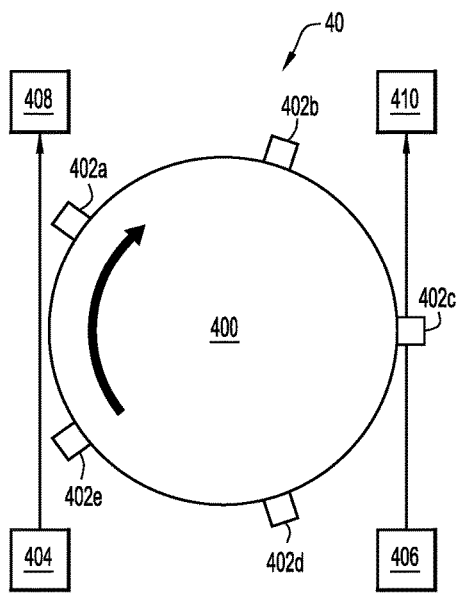
FIG.5C　　　　　　　　　　FIG.5D

DETERMINING ANGULAR POSITION FROM INDEX OF REFRACTION OFFSET

BACKGROUND

Precise measurement of the angular position of a rotating body is essential in many applications. For example, in the field of medical imaging, computed tomography (CT) scanning equipment requires knowledge of the angular position of the CT gantry during operation. Likewise, devices that employ rotating gimbals to orient equipment such as cameras and radar often need to know angular position in real time.

While conventional devices such as Michelson interferometers can be employed to measure the angular position of a rotating body, practical limitations prevent such solutions from working at higher speeds. For example, a gantry having a diameter of about 2 meters rotating at about 5 revolutions per second experiences outer diameter speeds of about 5 meters/second, which is too fast for conventional interferometric techniques relying on commercially available components. A need remains for high-accuracy techniques for measuring angular position that are capable of operating at a greater range of rotation rates.

SUMMARY

Described herein is a system for determining the angular position of a rotatable body. The system includes a plurality of refractive elements, such as glass blocks, extending radially outward from a peripheral surface of the rotatable body into an annular vicinity around the rotatable body at respective angular locations. A first emitter, such as a laser source, is configured to emit a first light beam along a first path extending in a direction substantially tangential to the rotatable body and through a first region within the annual vicinity around the rotatable body. At least some of the refractive elements are arranged to pass through and laterally shift the first light beam upon rotation of the rotatable body. Similarly, a second emitter is configured to emit a second light beam along a second path extending in a direction substantially tangential to the rotatable body and through a second region within the annual vicinity around the rotatable body, wherein at least some of the refractive elements are arranged to pass through and laterally shift the second light beam upon rotation of the rotatable body. A first detector is arranged to receive the first light beam beyond the first region and determines a first lateral offset of the first light beam, wherein the first lateral offset varies a function of an angle of incidence of the first light beam on a surface of a refractive element in the first path. A second detector is arranged to receive the second light beam beyond the second region and determines a second lateral offset of the second light beam, which varies as a function of an angle of incidence of the second light beam on a surface of a refractive element in the second path. A processor determines an angular position of the rotatable body based on the first and second lateral offsets.

The above and still further features and advantages of the described system will become apparent upon consideration of the following definitions, descriptions and descriptive figures of specific embodiments thereof wherein like reference numerals in the various figures are utilized to designate like components. While these descriptions go into specific details, it should be understood that variations may and do exist and would be apparent to those skilled in the art based on the descriptions herein.

BRIEF DESCRIPTION OF THE DRAWINGS

FIG. 3 is a table of data points corresponding to the graph of FIG. 2.

FIGS. 5A-5D illustrate operation of the system of FIG. 4 at four different points in time.

DETAILED DESCRIPTION

The techniques described herein enable measurement of the angular position (rotation angle) of a rotatable body at high rotational speeds and with high accuracy and are suitable for a wide range of rotation measurement applications. By placing refractive elements, such as glass blocks with parallel faces, around the perimeter of a rotating object, light can be transmitted through the refractive elements as they rotate with the rotating object, and the offset of the light caused by traveling through the refractive elements can be used to measure the angle of rotation. Using more than one refractive element and at least two offset-measuring devices results in continuous knowledge of angular position. As used herein and in the claims, the term "angular position," or equivalently "rotation angle" refers to the angular orientation, e.g., in degrees or radians, of a rotatable body relative to a reference position, such as the angular orientation of the rotatable body at an initial point in time (initial condition) or an angular orientation relative to a stationary or fixed point (e.g., a particular angular orientation designated as 0°). Depending on the application, the angular position can be specified as an absolute angle or a relative (modulo) angle (e.g., two and one half rotations could be specified as 900° or as 180°).

Offset of a beam of light due to traveling through a refractive element such as a glass plate or block at an angle is a well-documented physics phenomenon. The described technique takes advantage of that effect using a unique arrangement of refractive elements, light beams, and detectors to make very precise rotation angle measurements and can operate at extremely high speed with continuous resolution.

Figure 1:
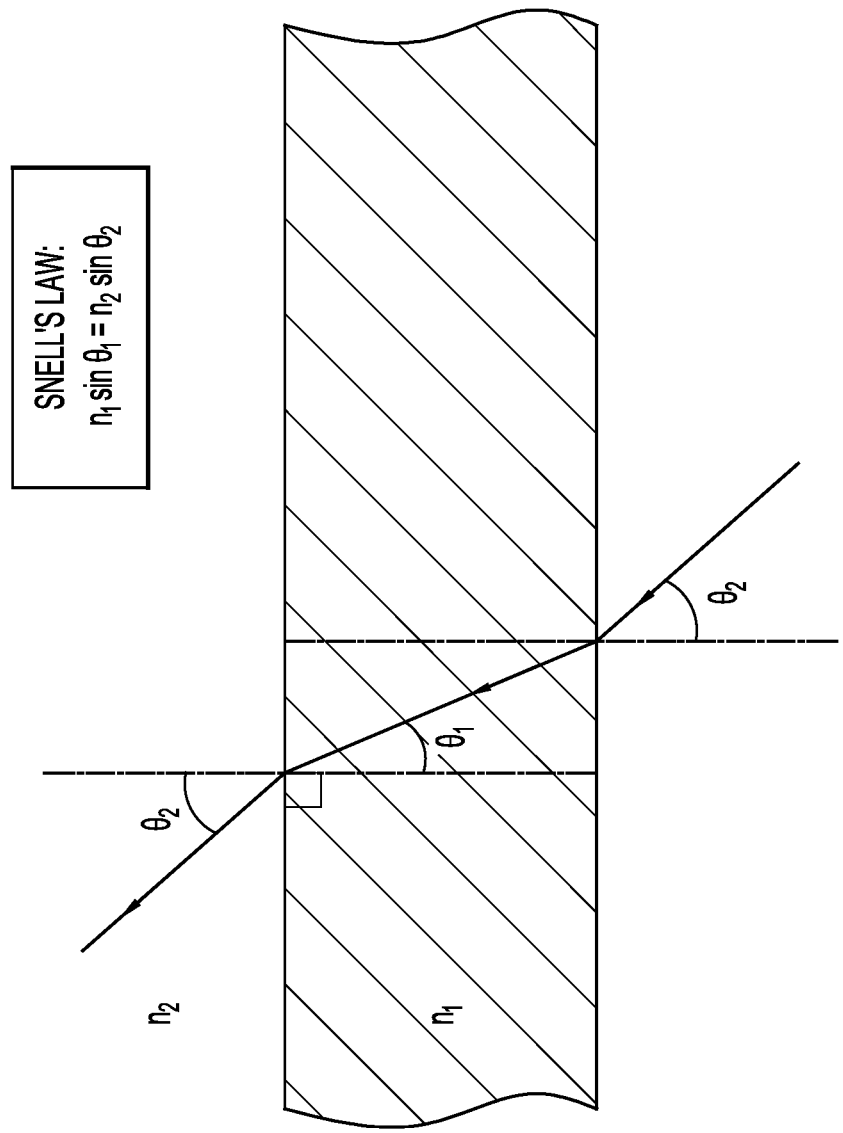
FIG. 1 is diagram illustrating the principle of Snell's law.

The technique relies on the principle that a beam of light traveling through a glass plate with parallel surfaces at an angle will exit the glass plate with the same direction vector as it entered, but will be offset in space as a function of the thickness of the plate, the index of refraction of the glass, and the angle at which the beam strikes the plate. As illustrated in FIG. 1, according to Snell's Law:

$$n_1 \sin \theta_1 = n_2 \sin \theta_2 \quad (1)$$

where $n_1$ is the index of refraction of the refractive element, $n_2$ is the refractive index of the ambient medium from which the light enters the refractive element and into which the light exits the refractive element, $\theta_1$ is the angle of refraction relative to the normal to the parallel surfaces of the refractive element, and $\theta_2$ is both the angle of incidence and the exit angle of the light, measured relative to the normal. The refractive index is also a function of the wavelength of the light.

Figure 2:
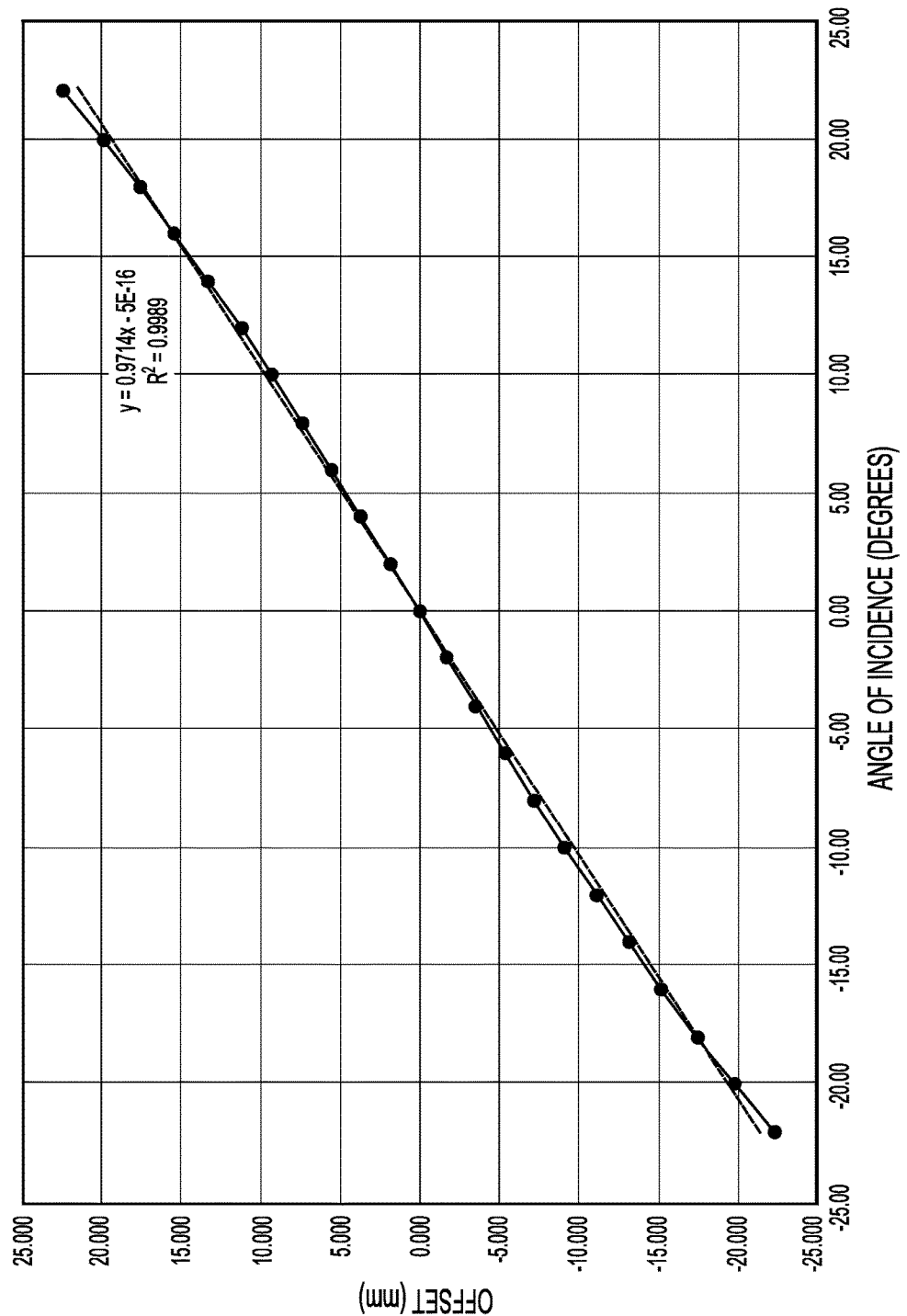
FIG. 2 is a graph of lateral offset as a function of angle of incidence of a refractive light beam for a particular wavelength, refractive element thickness, and index of refraction.

The refractive element's thickness and index of refraction are both fixed for a given glass plate and wavelength of light, so the angle of incidence can be directly determined geometrically from the offset of the beam of light. Beam offset is not strictly linear with incident angle, but for angles of incidence in the range of ±20 degrees or less, the offset is substantially linear to a high degree of precision, as shown in FIG. 2, which illustrates linear offset (in millimeters) as a function of angle of incidence (in degrees) for a refractive element having a thickness (length) of 125 mm and an index of refraction of 1.7 at a certain wavelength of light. In FIG. 2, the dashed line represents an ideal linear relationship between the angle of incidence and the lateral offset distance, and the solid line represents the actual offset distance as a function of the angle of incidence. The table shown in FIG. 3 corresponds to the graph of the solid line in FIG. 2 in tabular form. Note that $n_3$ in this table corresponds to the index of refraction of the exit medium, which in this case is the same as the index of refraction of the entrance medium $n_1$ with a value of 1.0.

Figure 4:
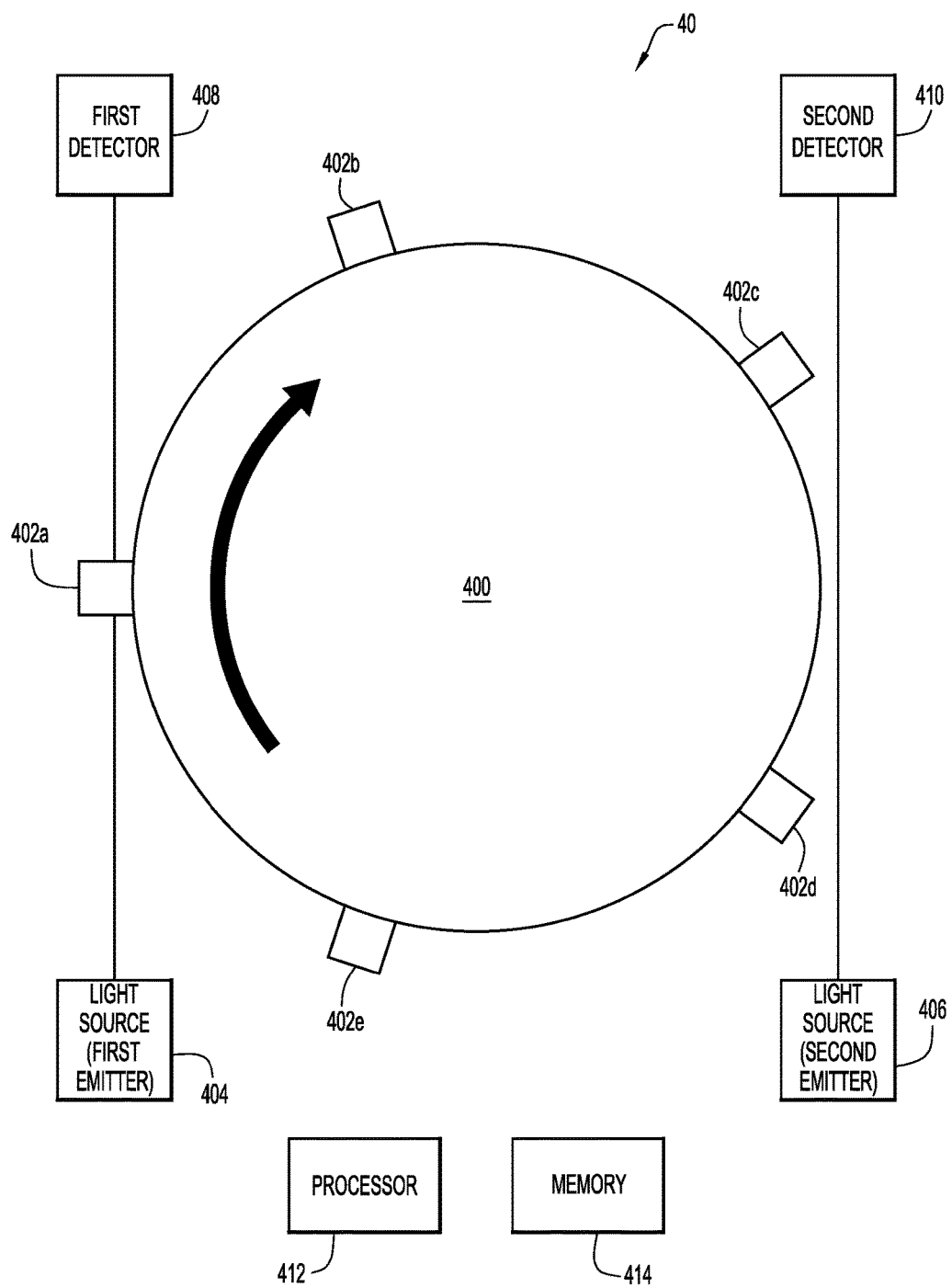
FIG. 4 is a conceptual block diagram of an example implementation of a system for determining the angular position of a rotatable body by measuring light beam offsets caused by refraction through rotating refractive elements.

FIG. 4 is a conceptual block diagram illustrating a system 40 that employs the aforementioned refractive principles to determine the angular position (rotation angle) of a rotatable body by measuring light beam lateral offsets. The system includes a set of refractive elements 402a-402e mounted on a peripheral surface of a rotatable body 400, such as a gantry or gimbal. Refractive elements 402a-402e extend radially outward from the peripheral surface into an annular vicinity around rotatable body 400 at respective, regularly-spaced angular locations. In the example shown in FIG. 2, rotatable body 400 is configured to rotate clockwise as viewed from above, and a total of five refractive elements are mounted on the rotatable body at evenly-spaced angles, with each refractive element being spaced at an angle of 72° from its adjacent elements, such that refractive elements 402a-402e rotate with rotatable body 400. It will be appreciated that the described system is not limited to exactly five refractive elements, and any number of suitable refractive elements that are geometrically feasible and that meet the operational requirements of the system can be used.

Each of refractive elements 402a-402e has first and second planar surfaces that are parallel to each other. The first surface is positioned to receive incident light upon rotation of the rotatable body such that the incident light transmitted through the refractive element exits via the second surface at the same angle the light enters the refractive element, but laterally offset (i.e., displace in a direction perpendicular to the direction the beam is traveling) owing to the refractive principles illustrated in FIG. 1. Each of refractive elements 402a-402e has a thickness (measured between the two parallel surfaces) and an index of refraction that determine the degree of the lateral offset of the light beam for the particular wavelength of the light.

By way of a non-limiting example, the refractive elements 402a-402e can have a surface-to-surface thickness of about 125 mm and an index of refraction of 1.7. According to one option, refractive elements 402a-402e are structurally identical in terms of index of refraction and thickness. According to another option, one or more of refractive elements 402a-402e can have a different index of refraction or a different thickness (or both) than others of the refractive elements. The values of the index of refraction, refractive element thickness, and light beam wavelength can be suitably adjusted to meet system requirements. For example, a reduction in the index of refraction of the refractive element requires a corresponding increase in the thickness of the refractive element to achieve the same beam displacement (lateral offset).

Refractive elements 402a-402e can comprise any suitable material that has a substantial degree of transmissivity at the wavelength of the light beam. According to one option, refractive elements 402a-402e can comprise glass blocks (e.g., cuboid shaped) or glass plates having a suitable index of refraction and transmissivity. By increasing the radial length of refractive elements 402a-402e, the angular range over which the refractive elements 402a-402e remain in a tangential light beam increases. However, to prevent more than one refractive element from being in a single beam at one time, a limiting condition exists whereby, beyond a certain length, the angular spacing between adjacent refractive elements would have to be increased to accommodate increasing radial lengths of the refractive elements, with a corresponding reduction in the overall number of refractive elements. Accordingly, designing refractive elements that protrude less allows for a greater number of refractive elements around the circumference, but each element will remain in a tangential light beam over a smaller angular extent and provide a smaller beam displacement (lateral offset).

Referring again to FIG. 4, a first light source (first emitter) 404 is arranged to emit a first light beam along a first path extending in a direction substantially tangential to rotatable body 400 and through a first region within the annual vicinity around rotatable body 400, i.e., the center of the first light beam is not aligned with the peripheral surface of rotatable body 400 in a truly tangential manner but rather follows a path just beyond the peripheral surface in the region through which refractive elements 402a-402e travel, which path is substantially tangential in the sense that it is parallel to and slightly offset from a tangent line. Similarly, a second light source (second emitter) 406 is arranged to emit a second light beam along a second path extending in a direction substantially tangential to rotatable body 400 and through a second region within the annual vicinity around rotatable body 400. In the orientation shown in FIG. 4, when viewing rotatable body 400 like a clock, the first region is in the vicinity of "9 o'clock" and the second region is in the vicinity of "3 o'clock," i.e., just to the left and right of rotatable body along a horizontal bisecting line, such that the first and second regions are 180° apart around rotatable body 400. In this example, the two light beams are substantially parallel to each other. It will be appreciated that the described system is not limited to this particular orientation, and any of a number of suitable arrangements for the light beams and emitters are possible.

First and second light sources 404 and 406 can be continuous-wave lasers that emit laser beams in the visible or near-visible spectrum at a wavelength for which refractive elements have substantial transmissivity. According to another option, first and second light sources 404 and 406 can generate divergent (non-laser) light beams. According to another option, optical elements such as one or more lenses can be used to shape the beam width of the light beams in one or both transverse directions, e.g., to produce a line source rather than a point source. One advantage of using a line source instead of a point source is that the light beam remains on the sensor longer, which reduces the criticality of the alignment of the system.

The first and second light beams are aligned with rotatable body 400 such that each of reflective elements 402a-402e rotate into and out of the first and second light beams as they rotate with rotatable body 400. As a refractive element first rotates into a light beam, the angle of incidence between the path of the light beam and the incident surface of the refractive element is relatively high, resulting in a correspondingly large lateral offset of the light beam in one direction. As the refractive element rotates into the beam further, the angle of incidence decreases to zero as the path of the light beam become normal to the surface of the refractive element, resulting in a lateral offset of zero. As the refractive element continues to rotate and begins to rotate out of the light beam, the angle of incidence again increases, albeit in an opposite direction relative to the normal, resulting in an increasingly large lateral offset of the light beam in a direction opposite to the lateral offset that occurred when the refractive element was entering the light beam. For example, in FIG. 4, as refractive element 402a initially rotates into the light beam from first emitter 404, the lateral offset is to the left, whereas the lateral offset is to the right as refractive element 402a rotates out of the first light beam. In accordance with the principles illustrated in FIG. 1, the lateral offset is perpendicular to the direction the light beam is traveling, so the direction of the light beam exiting the refractive element is the same as the direction of the incident light beam, albeit, offset laterally. That is, regardless of the orientation of the reflective element, the exit light beam remains parallel to the incident light beam, such that the offset distance in a plane perpendicular to the path of the light beam fully characterizes the angular position of the refractive element relative to the direction of the light beam.

As will be appreciated from the foregoing, the direction and magnitude of the lateral offset indicate the angular position of a refractive element within a light beam. By suitable alignment of the light sources 404 and 406 relative to the peripheral surface of rotatable body 400, the refractive elements can remain in the first and second light beams over a considerable angular extent, for example approximately 40° to 50° (±20° to 25°), depending on the placement of the beam, the radial length (protrusion) of the refractive elements, and the beam width of the light beam. Thus, while the lateral displacement (offset) of the beam for a given angle of incidence is a function of the thickness of the refractive element (as well as wavelength and index of refraction), the angular extent over which a refractive element remains within a light beam is function of how far the refractive element protrudes from the peripheral surface of the rotatable body.

Referring once again to FIG. 4, a first detector 408 comprises a sensor arranged to receive the first light beam from first emitter 404 beyond the first region (i.e., after the first light beam has passed through the region in which it can be intercepted and refracted by refractive elements 402a-402e). First detector 408 determines the lateral offset of the first light beam, which as previously explained, varies as a function of an angle of incidence of the first light beam on a surface of a refractive element in the first path. Similarly, a second detector 410 comprises a sensor arranged to receive the second light beam from second emitter 406 beyond the second region, and second detector 410 determines the lateral offset of the second light beam in the same manner as first detector 408.

For rapid rotation tracking, high speed detectors/sensors or line scanners or cameras can be employed as the first and second detectors 408 and 410. According to another option, laser stripe detectors can be used for detectors 408 and 410, which enables a very precise determination of the center of a laser stripe. According to other options, a two-dimensional CCD camera, a centroid detector, or virtually any CCD or CMOS line or 2D detector can be used. A line detector array has the practical advantage of faster data rates compared to comparable two-dimension arrays that inherently have more pixel data. Detectors 408 and 410 can be tailored to the physics of the rest of the system and vice versa. For example, if the system design is constrained by small, closely-spaced pixels, the thickness of the refractive elements or the index of refraction can be reduced to diminish the maximum lateral offset of the light beam.

Detectors 408 and 410 generate lateral offset (distance) values that indicate a perpendicular offset relative to a nominal, non-offset position of the light beam, and these values are a time function of the angular positions of the refractor elements 402a-402e relative to the first and second light beams. Thus, the output of detectors 408 and 410 is dual streams of lateral offset values. During one complete revolution of rotatable body 400, there are multiple instances where at least one of the streams of lateral offsets has a value of zero, either because there is no refractive element 204a-204e within that particular light beam or else because a refractive element is in a light beam but at a zero angle of incidence.

FIGS. 5A-5D provide a time sequence of four different rotation angles of the system shown in FIG. 4 to demonstrate the operational concepts of the system. In the example shown in FIG. 4, the two light beams are parallel with each other, and the spacing between the two incident light beams is slightly greater than the outer circumference of the rotatable body 400 such that, as rotatable body 400 rotates, the light beams are intermittently intercepted by refractive elements 402a-402e. For each of the two light beams, if the laser beam is not incident on a glass block at a particular rotation angle, the beam is received by the corresponding detector 408, 410 on the far side of rotating body 400 without being offset in the lateral direction (transverse to the direction of the light beam). If a refractive element is at a rotational angle at which it is in the path of one of the light beams, the beam is offset as a function of the angle of incidence as described above, and the refracted beam received at the corresponding detector 408, 410 is offset laterally by an amount indicative of the angle of incidence and therefore indicative of the angular position of the refractive element.

In FIG. 5A, in a first rotational position, refractive element 402a is at "9 o'clock" relative to rotational body 400, and therefore receives the first light beam from emitter 404 with an angle of incidence of 0° relative to the normal (no lateral offset). The other refractive elements 402b-402e are at angular positions in which they do not intercept either light beam, such that the second light beam from second emitter 406 is received by its corresponding detector with no lateral offset.

In a second rotational position shown in FIG. 5B, rotatable body 400 has rotated clockwise such that the first light beam from first emitter 404 is now incident on refractive element 402a at a non-perpendicular angle that results in the refracted first light beam being offset to the right at first detector 408. At the same time, refractive element 402c has now rotated into the path of the second light beam from second emitter 406, causing the refracted second light beam to be offset to the left at second detector 410 due to the significant angle of incidence of the second light beam on the refractive element 402c.

In a third rotational position shown in FIG. 5C, the rotatable body 400 has rotated clockwise further, such that the angle of incidence of the first light beam on refractive element 402a is even greater, resulting in a greater lateral offset to the right of the refracted first light beam at detector 408. At the same time, the angle of incidence of the second laser beam on refractive element 402c has been reduced, causing the refracted second light beam to be offset to the left by a lesser degree (i.e., the refracted second light beam is shifting to the right toward a neutral position).

In a fourth rotational position shown in FIG. 5D, refractive element 402a, originally at "9 o'clock" has now rotated completely out of the path of the first light beam, which travels from first emitter 404 to first detector 408 without passing through any refractive elements and has no lateral offset. Refractive element 402c in the path of the second light beam has now rotated to "3 o'clock" and therefore receives the second light beam with an angle of incidence of 0° (no lateral offset according to Snell's law). By tracking the combination of the two lateral offset positions at the two detectors, the rotational angle of the rotating circular body can be measured with great precision at very high rotational rates.

Referring once again to FIG. 4, a processor 412 receives the lateral offset measurements from first and second detectors 408, 410 and computes the time-varying angular position of rotatable body 400 from these streams of lateral offset values, using for example, the relationship between lateral offset and angular position shown in FIGS. 2 and 3. Mechanisms and computations by which angular position is determined from measurement data are well-known in the interferometer arts and need not be described in detail herein. For example, in the foregoing example, ten "null" conditions (two simultaneous zero-value lateral offsets) occur during each revolution, such that there is an ambiguity as to which reflective element is located in which light beam. Two such null conditions are shown in FIGS. 5A and 5D. As the rotatable body rotates, the values of the data streams directly indicate the angular position. For example, referring to the table in FIG. 3, if the first detector 408 measures on offset of 1.798 mm and the second detector 410 measures an offset of 0, one of the refractive elements is in the path of the first light beam an is offset by 2° relative to the location where the first light beam would be normal to the surfaces of the refractive element. In general, the combination of offset values maps directly to a specific angular position of the rotatable body, though without further measures, there would be an ambiguity as to which reflective elements are producing the offset values at a given instant where the refractive elements are identical and evenly spaced.

To resolve angular position ambiguity, processor 412 can perform a "totalizer" operation similar to that used with Michaelson interferometers, which allows determination of an absolute angular position from a series of ambiguous angular measurements. By way of a non-limiting example, a limit switch or an absolute position indicator or the like can be used to define "true zero" in a known manner, such that the totalizer operation performed by processor 412 enables continuous determination of the actual angular position of rotatable body 400 once an initial start position has been determined, so long as the detectors do not lose lock.

Processor 412 can be implemented in hardware, software, or a combination of hardware and software, as appropriate. For example, the processor can include one or more microprocessors or microcontrollers capable of executing program instructions (i.e., software) for carrying out at least some of the various operations and tasks to be performed within the measurement system. Measurement system 40 further includes one or more memory or storage devices 414 to store a variety of data and software instructions (control logic) for execution by processor 412. Memory 414 may comprise read only memory (ROM), random access memory (RAM), magnetic disk storage media devices, optical storage media devices, solid-state memory devices, flash memory devices, electrical, optical, or other physical/tangible (e.g., non-transitory) memory storage devices. Thus, in general, memory 414 comprises one or more tangible (non-transitory) processor-readable or computer-readable storage media that stores or is encoded with instructions (e.g., control logic/software) that, when executed by processor 412, cause processor 412 to perform the various data processing operations associated with determining the angular position of a rotatable body. One or more of the components of processor 412 can also be implemented in hardware as a fixed data or signal processing element, such as an application specific integrated circuit (ASIC) that is configured, through fixed hardware logic, to perform certain functions. Yet another possible processing environment is one involving one or more field programmable logic devices (e.g., FPGAs), or a combination of fixed processing elements and programmable logic devices.

Figure 6:
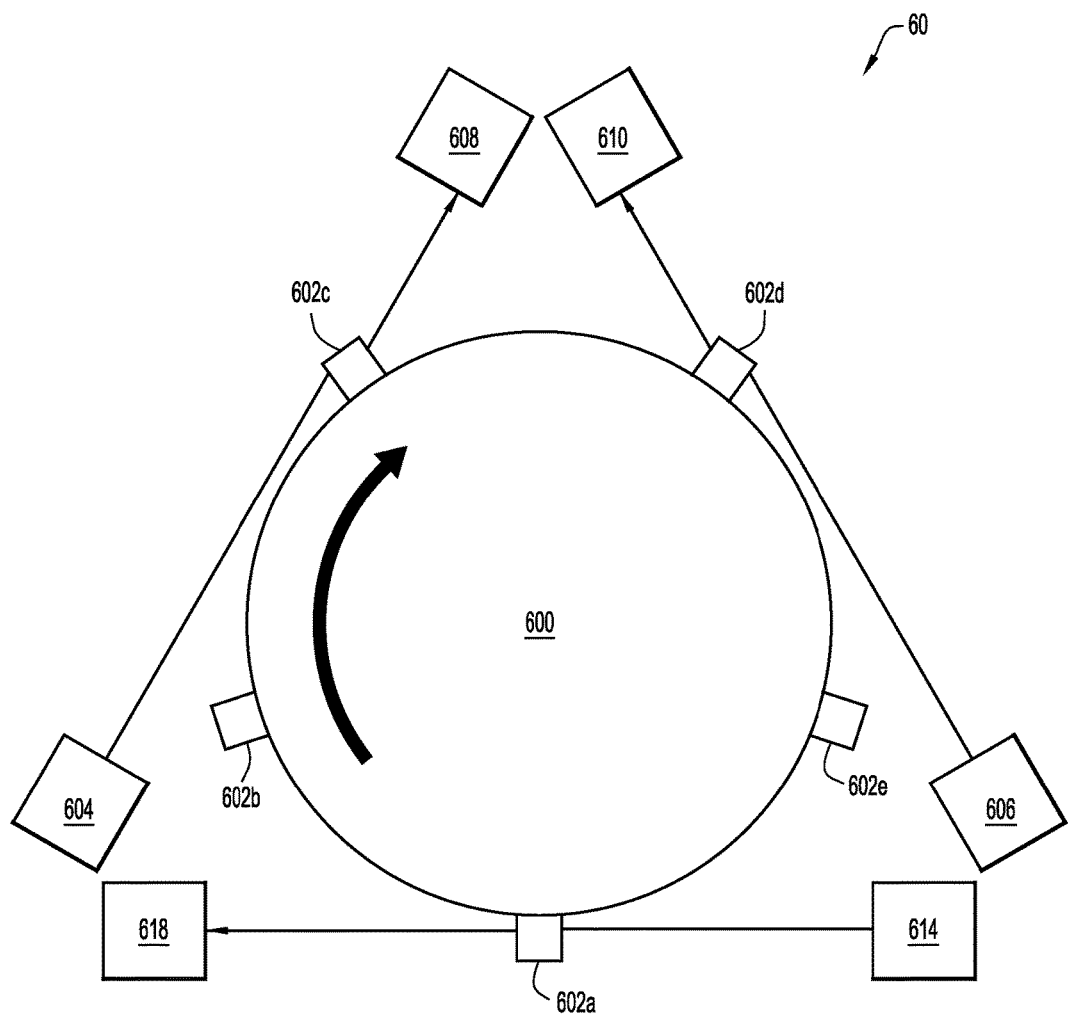
FIG. 6 is a conceptual block diagram of an example implementation of a system for determining the angular position of a rotatable body that employs three emitter-detector pairs.

A minimum of two optical beam lines are required to implement that aforementioned system. However, more than two light emitter-detector can be employed. FIG. 6 illustrates another implementation of a system 60 that employs the aforementioned refractive principles to determine the angular position of a rotatable body by measuring light beam offsets. Reference numerals 600, 602a-602e, 604, 606, 608, and 610 refer to components that correspond respectively those referred to by reference numerals 400, 402a-402e, 404, 406, 408, and 410 in FIG. 4. System 60 differs from system 40 is FIG. 4 in that three light emitter-detector pairs are employed, including third emitter 614 and third detector 618, which are substantially the same as the two other emitter-detector pairs. Instead of having two parallel light beams, in the configuration of FIG. 6, the three light beams are oriented at 120° relative to each other, in a regular triangular configuration. Use of three light beams provides redundancy in the event one of the emitter-detector pairs malfunctions, and otherwise the resulting three streams of lateral offset values potentially supports higher precision determination of angular position than the two streams of offsets provided by two light beams.

Figure 7:
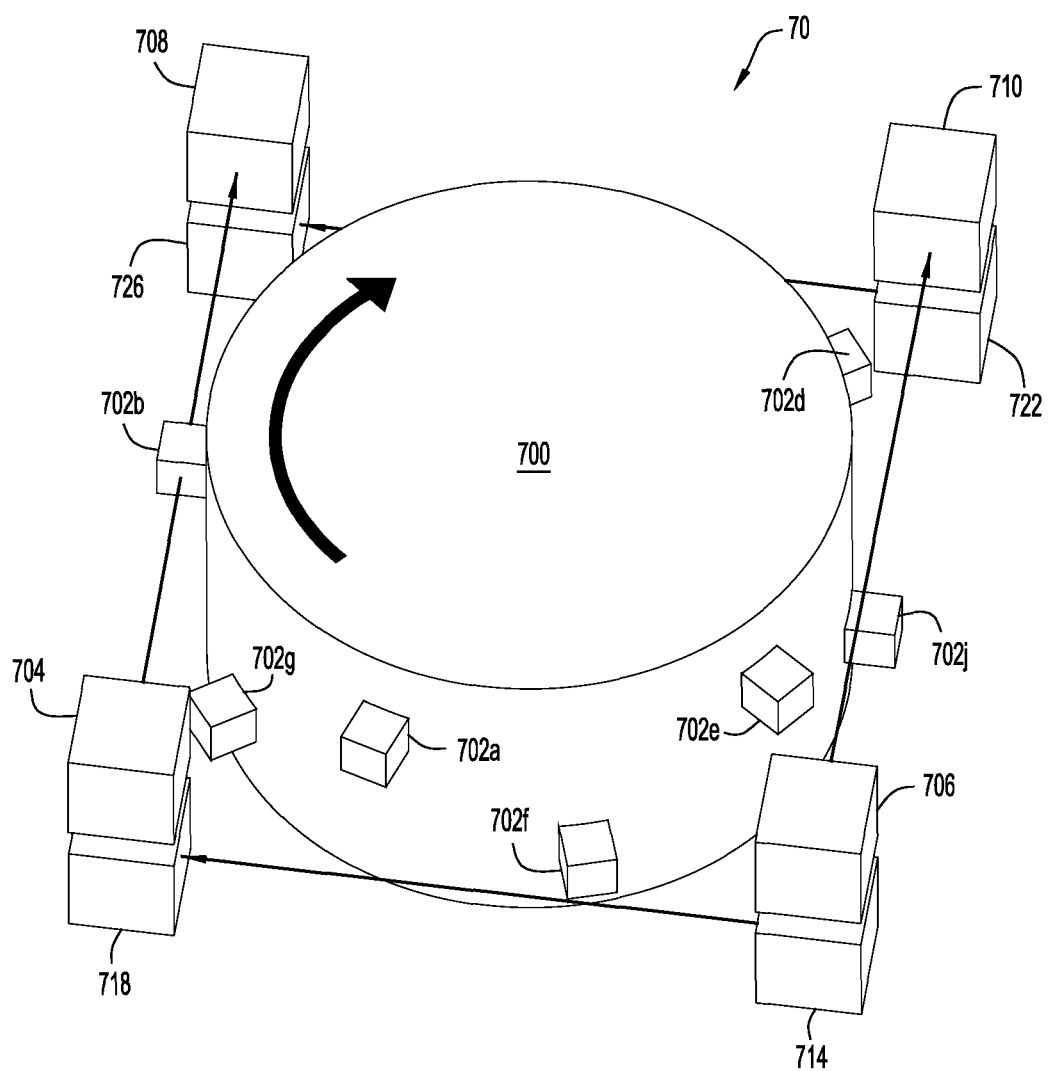
FIG. 7 is a conceptual block diagram of an example implementation of a system for determining the angular position of a rotatable body that employs four emitter-detector pairs.

FIG. 7 shows another implementation of a measurement system 70 in which four emitter-detector pairs are employed. Here, reference numerals 700, 702a-702e, 704, 706, 708, 710, 714, and 718 refer to components that correspond respectively those referred to by reference numerals 600, 602a-602e, 604, 606, 608, 610, 614, and 616 in FIG. 4. System 70 differs from system 60 is FIG. 6 in that four light emitter-detector pairs are employed instead of three, including fourth emitter 722 and fourth detector 726, which are substantially the same as the three other emitter-detector pairs. The first two emitter-detector pairs 704, 706, 708, 710 are arranged along a first, upper plane and interact with reflective elements 702a-702e in the same manner described in FIG. 4. The other two emitter-detector pairs 714, 718, 722, 726 are arranged along a second, lower plane and interact with reflective elements 702f-702j in a corresponding manner to the upper emitter-detector pairs (certain of the reflective elements are not visible in FIG. 7 due to the perspective view). The orientation of the four emitter-detector pairs results in four light beams respectively interacting with the refractive elements at four positions spaced apart by 90° around the rotatable body 700 (i.e., at 0°, 90°, 180°, and 270°) and provides even more redundancy and/or measurement precision.

Figure 8:
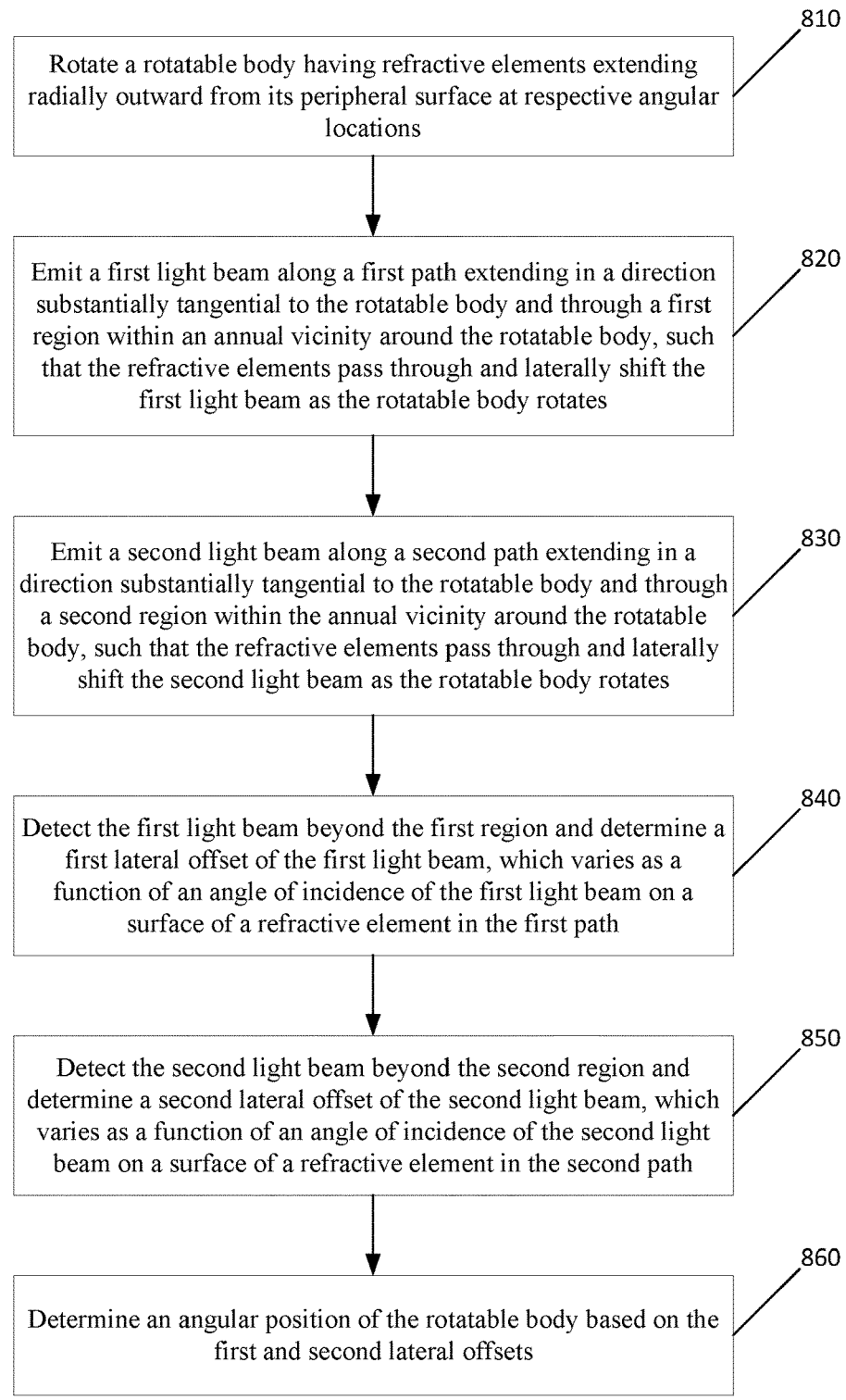
FIG. 8 is a flow chart illustrating operations performed to determining the angular position of a rotatable body

FIG. 8 is a flow chart summarizing the operations performed to determine the angular position of a rotatable body in accordance with the techniques described herein. In operation 810, a rotatable body is rotated, where a plurality of refractive elements extend radially outward from the rotatable body's peripheral surface into an annular vicinity around the rotatable body at respective angular locations such that the refractive elements rotate with the rotatable body. In operation 820, a first light beam is emitted from a first emitter along a first path extending in a direction substantially tangential to the rotatable body and through a first region within the annual vicinity around the rotatable body, wherein at least some of the refractive elements pass through and laterally shift the first light beam as the rotatable body rotates. In operation 830, a second light beam is emitted from a second emitter along a second path extending in a direction substantially tangential to the rotatable body and through a second region within the annual vicinity around the rotatable body, wherein at least some of the refractive elements pass through and laterally shift the second light beam as the rotatable body rotates. In operation 840, the first light beam is detected at a first detector beyond the first region and a first lateral offset of the first light beam is determined, wherein the first lateral offset varies as a function of an angle of incidence of the first light beam on a surface of a refractive element in the first path. In operation 850, the second light beam is detected at a second detector beyond the second region and a second lateral offset of the second light beam is determined, wherein the second lateral offset varies as a function of an angle of incidence of the second light beam on a surface of a refractive element in the second path. In operation 860, an angular position of the rotatable body is determined based on the first and second lateral offsets.

There are several benefits and advantages to the described approach to measuring rotation angle. Because the system relies on stationary light sources and detectors, the system provides a non-contact solution to measuring angular position with no moving parts other than the rotating body itself, with the reflective elements mounted thereon. The approach allows very high rotation rates while maintaining very precise knowledge of angle without interpolation. Implementation of the approach is straightforward for many rotating devices: refractive elements can be attached at multiple radii and locations to accommodate geometry and view factors, and laser sources and detectors can be located at multiple locations to accommodate geometry and view factors.

The described techniques have applicability in a wide range of technologies that require determination of the angular position (rotation angle) of a rotatable body and are particularly useful in applications involving higher rotation rates, e.g., above about 3 revolutions per second, or high-precision angular measurement. One such application is in the field of medical imaging to measure the position of a medical CT or MRI gantry. Others include applications involving high-speed or high-precision gimbals.

Having described example embodiments of techniques for determining the angular position of a rotatable body from light beam offsets induced by rotating refractive elements, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. An apparatus for determining the angular position of a rotatable body, comprising:
   a plurality of refractive elements extending radially outward from a peripheral surface of the rotatable body into an annular vicinity around the rotatable body at respective angular locations;
   a first emitter configured to emit a first light beam along a first path extending in a direction substantially tangential to the rotatable body and through a first region within the annular vicinity around the rotatable body, wherein at least some of the refractive elements are arranged to pass through and laterally shift the first light beam upon rotation of the rotatable body;
   a second emitter configured to emit a second light beam along a second path extending in a direction substantially tangential to the rotatable body and through a second region within the annual vicinity around the rotatable body, wherein at least some of the refractive elements are arranged to pass through and laterally shift the second light beam upon rotation of the rotatable body;
   a first detector arranged to receive the first light beam beyond the first region, the first detector determining a first lateral offset of the first light beam, the first lateral offset varying as a function of an angle of incidence of the first light beam on a surface of a refractive element in the first path;
   a second detector arranged to receive the second light beam beyond the second region, the second detector determining a second lateral offset of the second light beam, the second lateral offset varying as a function of an angle of incidence of the second light beam on a surface of a refractive element in the second path; and
   a processor configured to determine an angular position of the rotatable body based on the first and second lateral offsets.

2. The apparatus of claim 1, wherein the refractive elements each have first and second surfaces that are parallel to each other, wherein the first surface is arranged to receive incident light upon rotation of the rotatable body such that the incident light transmitted through the refractive element exits via the second surface.

3. The apparatus of claim 1, wherein the refractive elements comprise glass blocks having an index of refraction greater than 1.

4. The apparatus of claim 1, wherein the first and second emitters comprise lasers and the first and second light beams are laser beams.

5. The apparatus of claim 1, wherein:
   the first lateral offset is zero when the first light beam impinges on one of the refractive elements at an angle of incidence of 0° and when no refractive element is in the first path of the first light beam; and the second lateral offset is zero when the second light beam impinges on one of the refractive elements at an angle of incidence of 0° and when no refractive element is in the second path of the second light beam.

6. The apparatus of claim 1, wherein the first lateral offset varies substantially linearly with the angle of incidence of the first light beam on the refractive element in the first path and the second lateral offset varies substantially linearly with the angle of incidence of the second light beam on the refractive element in the second path.

7. The apparatus of claim 1, wherein the first and second detectors are linear detectors.

8. The apparatus of claim 1, wherein the first and second regions are angularly spaced by 180° about the peripheral surface of the rotatable body such that the first and second paths are substantially parallel.

9. The apparatus of claim 1, further comprising:
a third emitter configured to emit a third light beam along a third path extending in a direction substantially tangential to the rotatable body and through a third region within the annual vicinity around the rotatable body, wherein at least some of the refractive elements are arranged to pass through and laterally shift the third light beam upon rotation of the rotatable body; and
a third detector arranged to receive the third light beam beyond the third region, the third detector determining a third lateral offset of the third light beam, the third lateral offset varying as a function of an angle of incidence of the third light beam on a surface of a refractive element in the third path.

10. The apparatus of claim 9, further comprising:
a fourth emitter configured to emit a fourth light beam along a fourth path extending in a direction substantially tangential to the rotatable body and through a fourth region within the annual vicinity around the rotatable body, wherein at least some of the refractive elements are arranged to pass through and laterally shift the fourth light beam upon rotation of the rotatable body; and
a fourth detector arranged to receive the fourth light beam beyond the fourth region, the fourth detector determining a fourth lateral offset of the fourth light beam, the fourth lateral offset varying as a function of an angle of incidence of the fourth light beam on a surface of a refractive element in the fourth path.

11. The apparatus of claim 10, wherein the first and second emitters and the first and second detectors are arranged along a first plane, and the third and fourth emitters and the third and fourth detectors are arranged along a second plane that is parallel to the first plane.

12. A method for determining the angular position of a rotatable body, comprising:
rotating the rotatable body having a plurality of refractive elements extending radially outward from a peripheral surface of the rotatable body into an annular vicinity around the rotatable body at respective angular locations such that the refractive elements rotate with the rotatable body;
emitting from a first emitter a first light beam along a first path extending in a direction substantially tangential to the rotatable body and through a first region within the annual vicinity around the rotatable body, wherein at least some of the refractive elements pass through and laterally shift the first light beam as the rotatable body rotates;
emitting from a second emitter a second light beam along a second path extending in a direction substantially tangential to the rotatable body and through a second region within the annual vicinity around the rotatable body, wherein at least some of the refractive elements pass through and laterally shift the second light beam as the rotatable body rotates;
detecting at a first detector the first light beam beyond the first region and determining a first lateral offset of the first light beam, the first lateral offset varying as a function of an angle of incidence of the first light beam on a surface of a refractive element in the first path;
detecting at a second detector the second light beam beyond the second region and determining a second lateral offset of the second light beam, the second lateral offset varying as a function of an angle of incidence of the second light beam on a surface of a refractive element in the second path; and
determining an angular position of the rotatable body based on the first and second lateral offsets.

13. The method of claim 12, wherein the refractive elements each have first and second surfaces that are parallel to each other, wherein the first surface receives incident light upon rotation of the rotatable body such that the incident light transmitted through the refractive element exits via the second surface.

14. The method of claim 12, wherein the first and second light beams are transmitted through refractive elements having an index of refraction greater than 1.

15. The method of claim 12, wherein emitting first and second light beams comprises emitting first and second laser beams.

16. The method of claim 12, wherein:
the first lateral offset is zero when the first light beam impinges on one of the refractive elements at an angle of incidence of 0° and when no refractive element is in the first path of the first light beam; and
the second lateral offset is zero when the second light beam impinges on one of the refractive elements at an angle of incidence of 0° and when no refractive element is in the second path of the second light beam.

17. The method of claim 12, wherein the first lateral offset varies substantially linearly with the angle of incidence of the first light beam on the refractive element in the first path and the second lateral offset varies substantially linearly with the angle of incidence of the second light beam on the refractive element in the second path.

18. The method of claim 12, wherein detecting the first and second light beams comprises detecting with linear detectors.

19. The method of claim 12, wherein the first and second regions are angularly spaced by 180° about the peripheral surface of the rotatable body such that the first and second paths are substantially parallel.

20. The method of claim 12, further comprising:
emitting from a third emitter a third light beam along a third path extending in a direction substantially tangential to the rotatable body and through a third region within the annual vicinity around the rotatable body, wherein at least some of the refractive elements pass through and laterally shift the third light beam as the rotatable body rotates; and
detecting at a third detector the third light beam beyond the third region and determining a third lateral offset of the third light beam, the third lateral offset varying as a function of an angle of incidence of the third light beam on a surface of a refractive element in the third path.

* * * * *